United States Patent
Banach et al.

(10) Patent No.: US 8,998,268 B2
(45) Date of Patent: Apr. 7, 2015

(54) SINTER BONDED CERAMIC ARTICLES

(71) Applicants: Lawrence M. Banach, Lockport, NY (US); John M. Bevilacqua, Williamsville, NY (US); Steven W. Lanzone, Cheektowaga, NY (US)

(72) Inventors: Lawrence M. Banach, Lockport, NY (US); John M. Bevilacqua, Williamsville, NY (US); Steven W. Lanzone, Cheektowaga, NY (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 196 days.

(21) Appl. No.: 13/849,345

(22) Filed: Mar. 22, 2013

(65) Prior Publication Data

US 2013/0285370 A1    Oct. 31, 2013

Related U.S. Application Data

(60) Provisional application No. 61/614,497, filed on Mar. 22, 2012.

(51) Int. Cl.
| | |
|---|---|
| *C04B 35/565* | (2006.01) |
| *C04B 35/64* | (2006.01) |
| *C01B 31/36* | (2006.01) |
| *F16L 13/00* | (2006.01) |
| *C04B 37/00* | (2006.01) |

(52) U.S. Cl.
CPC .................. *F16L 13/00* (2013.01); *C04B 35/64* (2013.01); *C04B 35/565* (2013.01); *C01B 31/36* (2013.01); *C04B 37/00* (2013.01); *C04B 2237/365* (2013.01); *C04B 2237/52* (2013.01); *C04B 2237/84* (2013.01)

(58) Field of Classification Search
CPC ...... C04B 35/565; C04B 35/64; C01B 31/36; F16L 13/00
USPC .................................. 285/285.1; 156/89.11
See application file for complete search history.

(56) References Cited

U.S. PATENT DOCUMENTS

| | | |
|---|---|---|
| 3,564,328 A | 2/1971 | Bagley et al. |
| 4,179,299 A | 12/1979 | Coppola et al. |
| 4,299,638 A | 11/1981 | Matsuhisa |

(Continued)

FOREIGN PATENT DOCUMENTS

| | | |
|---|---|---|
| EP | 0479657 A1 | 4/1992 |
| EP | 1367037 A2 | 12/2003 |

(Continued)

OTHER PUBLICATIONS

Lougher et al. "Design of compression shrink-fit ceramic-steel wear ring assembly for chemical mechanical planarization", 6 pgs, 2000.

(Continued)

*Primary Examiner* — Michael C Miggins
(74) *Attorney, Agent, or Firm* — Abel Law Group, LLP; Robert N. Young

(57) ABSTRACT

A sintered ceramic article includes a silicon carbide tube and a silicon carbide base component circumscribing at least a portion of the tube and sinter-bonded to the tube. The sinter bond between the tube and the base component is defined as an interface bond and includes no bond materials. The interface bond has at least one of the following performance characteristics: a Shear Strength not less than about 25 MPa, a Nitrogen Seal Performance of not greater than 10%, a Helium Seal Performance of not greater than 10%, and/or a Vacuum Seal Performance of not greater than 10%.

20 Claims, 14 Drawing Sheets

(56) References Cited

U.S. PATENT DOCUMENTS

| | | |
|---|---|---|
| 4,487,664 A | 12/1984 | Dorbath et al. |
| 4,925,608 A | 5/1990 | Rossi |
| 2007/0235122 A1 | 10/2007 | Mesche et al. |
| 2008/0131665 A1 | 6/2008 | Suyama et al. |
| 2008/0176056 A1 | 7/2008 | Kilgus et al. |
| 2009/0239007 A1 | 9/2009 | Meschke et al. |
| 2010/0038012 A1 | 2/2010 | Tucker et al. |

FOREIGN PATENT DOCUMENTS

| | | |
|---|---|---|
| JP | 06298575 A | 10/1994 |
| KR | 20070043884 A | 4/2007 |
| KR | 20100014337 A | 2/2010 |
| WO | 2007042808 A1 | 4/2007 |

OTHER PUBLICATIONS

International Search Report and Written Opinion dated Jul. 5, 2013, with regard to International application PCT/US2013/033575.
International Search Report and Written Opinion dated Jul. 24, 2013 with regard to international application PCT/USPCT/US13/33574.

US 8,998,268 B2

SINTER BONDED CERAMIC ARTICLES

CROSS-REFERENCE TO RELATED APPLICATION

This application claims priority under 35 U.S.C. §119(e) to U.S. Patent Application No. 61/614,497 entitled "SINTER-BONDED CERAMIC ARTICLES," by Banach et al., filed Mar. 22, 2012, which is assigned to the current assignee hereof and incorporated herein by reference in its entirety.

FIELD OF THE DISCLOSURE

The following is directed to sinter-bonded ceramic bodies, particularly ceramic bodies or assemblies for use in heat exchangers, heat exchangers, and methods for forming the same.

BRIEF DESCRIPTION OF THE INVENTION

A sintered ceramic article includes a first component and a second component circumscribing at least a portion of the first component and sinter-bonded to the first component. In an embodiment, the first and second components include silicon carbide. In an embodiment, the first component is a tube. In this embodiment, the sinter bond between the tube and the second component is defined as an interface bond, or an interference bond, and includes no bond materials. The interface bond has at least one of the following performance characteristics: a Shear Strength not less than about 25 MPa, a Nitrogen Seal Performance of not greater than 10%, a Helium Seal Performance of not greater than 10%, and/or a Vacuum Seal Performance of not greater than 10%.

A method of making a sintered ceramic article includes pre-sintering a first silicon carbide component, and providing a green, un-sintered second silicon carbide component to circumscribe the first silicon carbide component. The first and second silicon carbide components are then co-sintered to provide a sintered bond, or interference bond, between the first and second silicon carbide component. The green silicon carbide material shrinks to some degree upon sintering, and the quality of the interference bond is at least in part due to selecting a size of the green, un-sintered second silicon carbide component. The quality of the interference bond is also attributable to preparing the surface of the first, pre-sintered silicon carbide component to remove contaminants from its surface.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
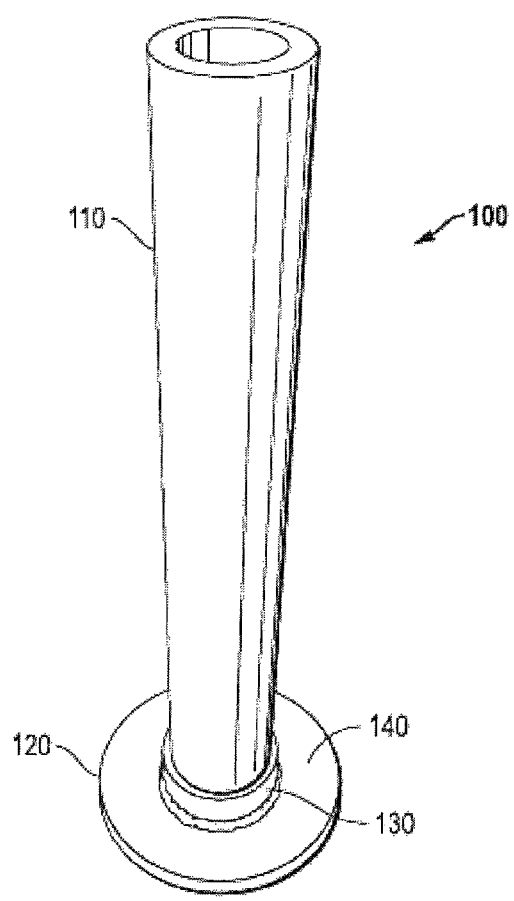
FIG. 1 depicts an embodiment of a ceramic article including a tube sinter-bonded to a flange.

Embodiments of the present invention are generally directed to ceramic articles, and methods for forming ceramic articles. In particular, in one embodiment, a sintered ceramic article includes a first component, and a second component circumscribing at least a portion of the first component. Each of the first and second components may be a tube a cap, flange, tube sheet, cylindrical body, or sleeve. The first and second components may comprise silicon carbide, and in certain embodiments comprise principally silicon carbide, such that silicon carbide is the majority compositional species of the tube, typically greater than at least about 70 wt %, such as greater than at least about 80 wt %, or greater than at least about 90 wt %. In another embodiment, the tube may comprise silicon carbide in an amount greater than at least about 91 wt %, such as greater than at least about 99.85 wt %.

A base component or second component ("base component" and "second component" are used herein interchangeably) may circumscribe at least a portion of the first component, and is generally sinter-bonded to the first component. In one embodiment, the first component may circumscribe at least a portion of the second component, and is generally sinter-bonded to the second component. In one embodiment, the interface between the first and the second component exhibits a Shear Strength not less than about 25 MPa, not less than about 40 MPa, not less than about 50 MPa, not less than about 75 MPa, not less than about 100 MPa, not less than about 120 MPa, not less than about 140 MPa, not less than about 170 MPa, or not less than about 200 MPa. In one embodiment, the interface between the first and the second component exhibits a Shear Strength not greater than about 1000 MPa, such as not greater than about 700 MPa, not greater than about 500 MPa, or not greater than about 300 MPa.

As used herein, reference to Shear Strength as a particular Shear Strength value is measured by testing a sample having standardized dimensions under load. In particular, the Shear Strength is measured by preparing and testing a standardized sample as follows. The sample is prepared from a ceramic tube and a ceramic ring, each having a length of 76.2 mm. The ceramic tube has an outer diameter ($OD_t$) of 14 mm and an inner diameter ($ID_t$) of 11 mm. The ceramic ring has an outer diameter ($OD_r$) of 20 mm, and an inner diameter ($ID_r$) of 14 mm. The ceramic ring is placed around the ceramic tube so that the ends of each are flush, and the tube-ring assembly is then co-sintered. After cooling, a cross-sectional center segment is sliced from the sintered assembly and thickness grinded to a final thickness (t) of 3 mm. The center segment comprises an inner ring sliced from the ceramic tube and an outer ring sliced from the ceramic ring. The area of contact between the inner and outer rings represents the total bond area ($A_b$), and is calculated according to the following formula:

$$A_b = \pi \cdot OD_t \cdot t \quad \text{(Formula I)}$$

The Shear Strength of the center segment sample is tested at room temperature using an Instron 8562 using a 100 kN load cell at a speed of 0.05 mm/min, which applies equal but opposing force to the inner and outer rings, respectively. The magnitude of the applied force is gradually increased until the rings break apart. The force (F) required to break the rings apart is measured in Newtons. The Shear Strength ($\tau$) value is obtained according to the following formula:

$$\tau = F \cdot A_b \cdot 10^6 \quad \text{(Formula II)}$$

It should be understood that ceramic articles as described herein can be a wide variety of dimensions and overall sizes, but the Shear Strength values are based on a standardized geometry and testing approach as described above. Consequently, validating the Shear Strength of a sample having differing dimensions larger or smaller than the standardized sample described above requires the fabrication of a standardized sample under identical compositional and processing conditions to that of the sample having differing dimensions.

Although various forming techniques can be utilized for fabrication of a tube, or first or second component, such as slip casting, isopressing, machining of large stock materials, and other forming techniques, extrusion may be used according to particular embodiments. Extrusion represents a cost-effective and desirable fabrication approach for making multiple articles requiring tubes of varying lengths and diameters. In this respect, the diameter of the tubes can vary over a wide range, such as ¼ inch in outside diameter to 12 inches or even greater sizes. Length, too, can vary as well with length varying from just 1-2 feet to 15, 20, and even lengths reaching 30 feet and above. With respect to the relationship of length (L) to outer diameter (OD) referred to herein as aspect ratio, generally the tube will have an aspect ratio of not less than about 10, such as not less than about 20, such as not less than about 30, or not less than about 40. Typically, the aspect ratio is limited, as extended length tubes are difficult to handle and fully sinter. Consequently, aspect ratios typically are not greater than 300.

As stated above, the first and second components may be formed of a ceramic, such as silicon carbide, and such as principally silicon carbide. One particular form of silicon carbide is used according to certain embodiments, known as HEXOLOY®-brand silicon carbide (manufactured by Saint-Gobain Advanced Ceramics Corporation of Worcester, Mass., USA), described in U.S. Pat. No. 4,179,299 incorporated herein by reference in its entirety. Suitable silicon carbides generally contain silicon carbide in an amount greater than at least about 91 wt %, such as greater than at least about 99.85 wt %, up to about 5.0 wt % carbonized organic material, from at least about 0.15 wt % to not greater than about 3.0 wt % boron, and up to about 1.0 wt % additional carbon. The "carbonized organic material" is free carbon or uncombined carbon produced in situ by the carbonization of the organic material used as a raw material in the process of forming the ceramic tube. The carbonizable organic materials that can be used in forming the ceramic tube include, but are not limited to, phenolic resin, coal tar pitch, polyphenylene, or polymethylphenylene.

Sintered ceramic bodies of silicon carbide according to an embodiment may be characterized by a predominantly equi-axed microstructure, meaning the presence of grains having an aspect ratio of less than 3:1 (i.e., the ratio of the maximum dimension of the grains of the crystal microstructure to the minimum dimension of the grains of the crystal microstructure is less than 3:1). Moreover, the silicon carbide comprises at least about 95 wt %, such as at least about 99 wt % alpha-phase, non-cubic crystalline silicon carbide.

The density of silicon carbide according to an embodiment is at least about 2.40 g/cm³, such as at least about 2.90 g/cm³, or at least about 3.05 g/cm³.

Sintered ceramic bodies of silicon carbide according to an embodiment may be characterized by the amount the bodies shrink from a green state to a fully sintered state. For example, green ceramic bodies of silicon carbide according to an embodiment may shrink more than about 10% from their original size, more than about 12%, more than about 15%, more than about 17%, less than about 25%, less than about 20%, less than about 17%, less than about 15% upon being fully sintered. In a particular embodiment, a green ceramic body of silicon carbide may shrink approximately 17% from its original size upon being fully sintered. When combining a pre-sintered first component, such as a tube, with a green second component, such as a flange, that circumvents the pre-sintered first component, the shrinkage relationship, and the amount of interference bond, can be expressed as follows.

$$ID_{f,FS} = OD_t - \Delta, \text{ where}$$

$ID_{f,FS}$ is the inside diameter (ID) of a fully sintered flange, $OD_t$ is the outside diameter (OD) of the pre-sintered tube, and $\Delta$ is the intereference (flange undersizement). For example, a pre-sintered tube has a bond surface, or outside diameter, of 2.0" (i.e. $OD_t$=2.0). An interference bond of 5% of a second body (i.e. $\Delta$=5%) requires a fully sintered flange to be 0.10" less than the $OD_t$ (i.e. 2.0*5%=0.10), or 1.90" (i.e. $ID_{f,FS}$=$OD_t$-$\Delta$, or 1.90"=2.0"-0.10"). Thus, to attain a 5% interference of a fully sintered flange on the pre-sintered tube, the green flange will be made to have a theoretically fully sintered inner diameter (if it were sintered by itself) of 1.90".

Further, the ID of the green second component can be expressed as follows.

$$ID_{f,FS}/(1-R_s) = ID_f, \text{ where}$$

$ID_f$ is the inner diameter of the green second component, or flange, and $R_s$ is the shrinkage rate of the second component (expressed as a decimal). Thus, in accordance with the example given above, and assuming the shrinkage rate of the second component is 17.0%, the inner diameter of the green flange ($ID_f$) can be calculated as 1.9÷(1−0.170)=2.289".

Turning to the second component, the second component may be formed by any one of various geometries. Those geometries include a cap (which may cover an end of the tube, desirably providing a complete hermetic seal), a flange (typically completely circumscribing the tube), a cylindrical body (that may be coaxial with the tube to provide essentially a two-ply structure), a two-layer structure, or a tube sheet. In the case of flange, according to one embodiment, the flange circumscribes the tube about an outer diameter of the tube, the flange having a radially projecting wall terminating at a position to define an outer dimension of the flange. In the case of a flange being coaxial with the tube, the flange may define an outer diameter greater than the nominal outer diameter of the tube. For example, the outer diameter of the flange may be not less than about 1.2×(outer diameter of the tube), not less than 1.3×(outer diameter of the tube), or not less than 1.4×(outer diameter of the tube). The orientation of the radially projecting wall of the flange may be at essentially any projecting angle relative to the longitudinal axis of the tube. However, typically, the wall projects perpendicularly with respect to the longitudinal axis to the tube. Additionally, the radially projecting wall can have a planar surface. A planar surface can be used to enhance the sintering performance of the ceramic article as integrated into a larger structure, by providing additional surface area against which to create a seal and establish an environment outside the tube distinct form the environment inside the tube. Such an establishment of a good quality seal is important in various uses, such as in the context of heat exchangers.

In the case of a tube sheet, a ceramic circular disc having a plurality of holes or perforations is provided to accommodate a plurality of ceramic tubes. One end of each tube is inserted into one of the holes or perforations of the tube sheet, wherein the ceramic tube can be sinter bonded to the tube sheet along an interface at an inside surface of the respective hole. Opposite ends can be interconnected with each other with caps that bridge adjacent tubes to each other and provide fluid communication therebetween. Alternatively, each end of each tube can be inserted into a respective tube sheet, the tube sheets having an inside facing minor image configuration of holes or perforations. Each tube end can be sinter-bonded to one of the two tube sheets along an interface at an inside surface of the hole in which the end is inserted. The single or double tube sheet arrangement can additionally be provided with a housing to encase the plurality of ceramic tubes and the tube sheet or sheets. Such an assembly has a variety of uses, such as in the context of heat exchangers.

In the case of a cap, according to one embodiment, the cap may have an outer circumference that is not greater than the inner diameter of the tube such that the cap may be disposed within the bore of the tube. The cap may close the inner bore of the tube at any position along the axial length of the tube.

A Nitrogen Seal Performance is determined according to a nitrogen seal performance test, wherein nitrogen is applied at an interface of a seal at a given initial positive pressure, and pressure loss is measured by a pressure gauge. Nitrogen Seal Performance is the percent pressure drop occurring across the seal interface over a period of 2 hours at an applied gauge pressure, such as 200 psi. Embodiments herein achieve a Nitrogen seal performance of not greater than 10%, not greater than 9%, not greater than 8%, not greater than 7%, not greater than 6%, not greater than 5%, not greater than 4%, not greater than 3%, not greater than 2%, not greater than 1.9%, not greater than 1.8%, not greater than 1.7%, not greater than 1.6%, not greater than 1.5%, not greater than 1.4%, not greater than 1.3%, not greater than 1.2%, not greater than 1.1%, not greater than 1.0%, not greater than 0.9%, not greater than 0.8%, not greater than 0.7%, not greater than 0.6%, not greater than 0.5%, not greater than 0.4%, not greater than 0.3%, not greater than 0.2%, or not greater than 0.1% of an initial pressure differential of 200 PSI (gauge pressure).

A Helium Seal Performance is determined according to a helium seal performance test, wherein helium is applied at an interface of a seal at a given initial positive pressure and pressure loss is measured by a pressure gauge. Helium Seal Performance is achieved if the pressure drop occurring across the seal interface over a period of 2 hours is not greater than 10%, not greater than 9%, not greater than 8%, not greater than 7%, not greater than 6%, not greater than 5%, not greater than 4%, not greater than 3%, not greater than 2%, not greater than 1.9%, not greater than 1.8%, not greater than 1.7%, not greater than 1.6%, not greater than 1.5%, not greater than 1.4%, not greater than 1.3%, not greater than 1.2%, not greater than 1.1%, not greater than 1.0%, not greater than 0.9%, not greater than 0.8%, not greater than 0.7%, not greater than 0.6%, not greater than 0.5%, not greater than 0.4%, not greater than 0.3%, not greater than 0.2%, or not greater than 0.1% of an initial pressure differential of 87 PSI (gauge pressure), an initial pressure differential of about 200 psi (about 13.8 bar), or an initial pressure differential of about 6 barg (bar gauge).

A Vacuum Seal Performance is determined according to a vacuum seal performance test. In the vacuum seal performance test, a vacuum is applied to a seal. The nitrogen gas atmosphere inside the tube is then lowered from 1 ATM (760 torr) to a pressure of 10 torr thereby having a pressure differential of 750 torr. Vacuum Seal Performance is achieved if the gain inside the tube occurring across the seal interface over a period of 2 hours is not greater than 10%, not greater than 9%, not greater than 8%, not greater than 7%, not greater than 6%, not greater than 5%, not greater than 4%, not greater than 3%, not greater than 2%, not greater than 1.9%, not greater than 1.8%, not greater than 1.7%, not greater than 1.6%, not greater than 1.5%, not greater than 1.4%, not greater than 1.3%, not greater than 1.2%, not greater than 1.1%, not greater than 1.0%, not greater than 0.9%, not greater than 0.8%, not greater than 0.7%, not greater than 0.6%, not greater than 0.5%, not greater than 0.4%, not greater than 0.3%, not greater than 0.2%, or not greater than 0.1% of the pressure differential (750 torr).

Figure 16:
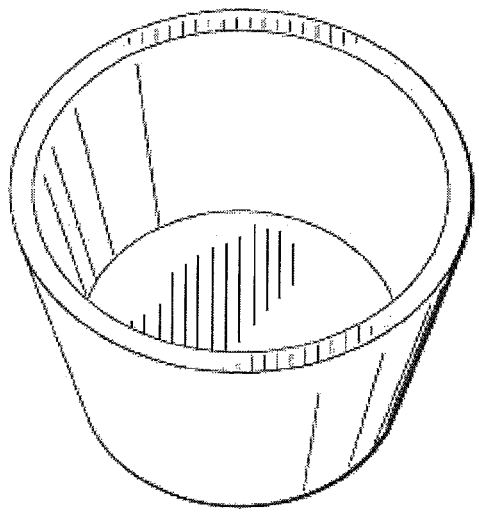
FIG. 16 shows a top perspective view of a crucible according to an embodiment.
Figure 17:
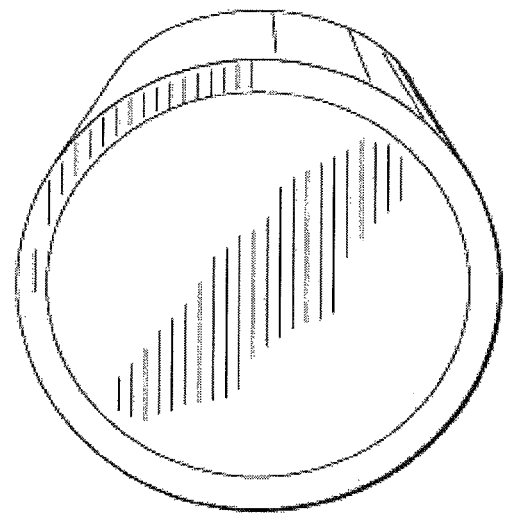
FIG. 17 shows a bottom perspective view of the crucible of FIG. 16.

In each of the seal performance tests, the bond or interface is subjected to the above-described pressure differential. Depending on the geometry of the part, an inner volume is pressurized or evacuated, and holes plugged. In a case of an external seal, such as in the case of a flange on a tube, an end-cap is positioned to cover the flange and exposed bore of the tube, the cap being offset from the bore to allow fluid communication (and hence pressure/vacuum) extending radially up to the bond region. Caps/plugs can have varying geometries to fit the part undergoing test, and can be sealed with a vacuum grease to ensure a pressure tight, hermetic seal. One such geometry of a cap/plug is shown in FIGS. 16 and 17 where the cap/plug fits inside the tube or cylinder to seal off an end of the tube or cylinder. The article of FIGS. 16 and 17 may be termed a crucible. In an embodiment such as that illustrated in FIGS. 16 and 17, it should be understood that the cap/plug is the first component and the tube or cylinder is the second component. Thus, it should be understood that, in accordance to the methods discussed above, the cylinder of the crucible is sintered to shrink around the pre-sintered cap/plug to provide an interference bond thereto.

While reference to a second component has been described above, it is to be recognized that a third or several base components may be integrated along the length of the tube. For example, the base components, such as a second component and a third component, may be in the form of flanges positioned at opposite axial ends of a first component, such as a tube, each flange circumscribing the tube about an outer diameter of the tube, and each flange having a respective radially projecting wall terminating at a position to define an outer dimension of the flange that advantageously can be utilized to enable to a fluid-tight or hermetic seal with an outside environment.

Sintered ceramic articles as described herein can be formed through a multi-step sintering approach. For example, a green ceramic tube is formed through any one of suitable shape forming technologies, such as molding, slip casting, isopressing, machining, and particularly extrusion. As is generally understood in the art, the green ceramic tube generally contains a water or organic liquid phase combined with various processing aids and binders. For additional information on compositional details, reference can be made to U.S. Pat. No. 4,179,299 incorporated herein by reference in its entirety.

Upon completion of forming a green ceramic first component, the first component proceeds to a pre-sintering step to form a sintered first component. Pre-sintering can be carried out in any one of known furnaces, including continuous furnaces that translate the work piece (herein, the tube) through the furnace at a constant or variable rate. Pre-sintering is generally carried out at a temperature above 2000° C., such as above 2050° C., but generally below 2400° C., such as below 2300° C., such as below 2250° C. A suitable target range for sintering the green ceramic first component in the case of silicon carbide can lie within a range of 2100-2200° C. Sintering times can vary, and are largely dependent on the thermal mass of the first component. However, typically sintering times range from 15 minutes to 10 hours, such as not less than about 30 minutes, such as not less than about 1 hour, such as not less than about 1.5 hours. While large, high mass tubes or base components may require extended sintering times, typically sintering times do not exceed 30 hours, such as not great than 20 hours, such as not greater than 10 hours. After the sintering step is completed, at least a portion of an outer or inner surface of the sintered first component is subjected to surface cleaning. In an embodiment, at least the portion of the pre-sintered first component that will contact the second component to which the first component will be sintered will be subjected to surface cleaning. In this respect, it has been found that the outer surface of the pre-sintered first component can carry contaminates, such as contaminates that are deposited during the sintering process, or which form as a consequence of the sintering process and changes in the crystallographic and compositional structure of the first component. For example, binders within the composition may burn-out, leaving behind a carbonaceous residue on the outer surface of the first component. That carbonaceous residue, generally in the form of free carbon, can negatively impact the quality of bond between the first and the second component, inhibiting a hermetic seal.

Subsequent to surface cleaning, in one embodiment, a second, or base, component is positioned to circumscribe a partially or fully sintered first along that portion subjected to surface cleaning. Here, the second component component is in an un-sintered state or a partially-sintered state. In the case of a partially-sintered state, typically the second component has not been sintered so as to have shrunk to its final dimensions. After placement of the second component, the first component is again sintered, but with the second component positioned in contact with the ceramic tube. This may be referred to as co-sintering. During the co-sintering process, the second component shrinks to its final dimensions and can exert a compressive load on the first component, and be in contact with the outer surface of the first component. However, not only does the compressive load cause a mechanical, interference fit, but also a crystallographic or chemical bond. Here, the interior surface of the second component and the exterior surface of the first component in contact therewith at elevated, sintering temperature, causes a creation of a sinter-bond, along which the materials of each of the components form strong crystallographic or chemical bonds therebetween. The surface cleaning as described above helps promote the formation of a strong sinter bond, thereby forming a hermetic seal having a high level of mechanical robustness.

The process flow for forming ceramic articles according to embodiments herein may also include a machining operation, during which the outer surface of a first component (such as a tube) or a second component (such as a cap, flange, tube sheet, cylindrical body, or sleeve) is machined prior to pre-sintering. It should also be understood that a first component may include a cap, flange, tube sheet, cylindrical body, or sleeve, and that a second component may include a tube. In one embodiment, the machining operation can include circumferentially machining or longitudinally machining an outer surface of the component prior to pre-sintering. Stated alternatively, this machining step may be carried out in the green state, where the first or second component is in a state that allows easier material removal than in the sintered state. Moreover, the machining may be effective to reduce or even completely remove dimensional (out-of-roundness) or surface irregularities of the green first or second component. For example, in the case of extrusion, the green first or second component may have characteristic score lines extending partially or wholly along the entire length of the first or second component. Those score lines can inhibit the formation of a strong interfacial sinter bond, as well as a hermetic seal. In the case of other formation technologies, machining may still be desirable. For example, in the case of isopressing or molding, characteristic imperfections may be left behind on the green first or second component, such as a flashing.

Both the surface cleaning and machining steps may be carried out through mechanical abrasion processes. Mechanical abrasion can include machining using a free abrasive (e.g., an abrasive slurry), a coated abrasive, or a fixed abrasive. The species of abrasive product is chosen to prevent unwanted chemical interaction with or foreign deposits on the tube or base component, while also providing adequate material removal rates. Generally speaking in the case of silicon carbide, abrasive materials such as alumina are avoided, and materials such as silicon carbide and superabrasives, notably including cubic boron nitride (CBN) and diamond, are utilized. In the green state, machining may be carried out with silicon carbide and in the sintered state, surface cleaning may be done with silicon carbide or a superabrasive species. In practice, embodiments have made use of coated abrasives, such as a silicon carbide, CBN, or diamond abrasive coated on a closed looped belt, mounted to a belt sander.

While the cleaning steps above set forth in connection with a component, particularly the outer surface of a first or second component, the foregoing cleaning operations can be carried out with respect to an inner surface of a component, particularly the inner surface of the first component at a portion that will contact the second component to be sinter-bonded thereto, or the inner surface of the second component at a portion that will contact the first component to be sinter-bonded thereto.

Particular embodiments are described in connection with the drawings.

Turning to FIG. 1, a ceramic article 100 is shown that includes a tube 110, and a base component in the form of flange 120. As shown, the flange 120 has a radially projecting wall 130, presenting a planar surface 140. As described herein, the tube is pre-sintered, and the flange 120 is sinter-bonded to the tube.

Figure 2:
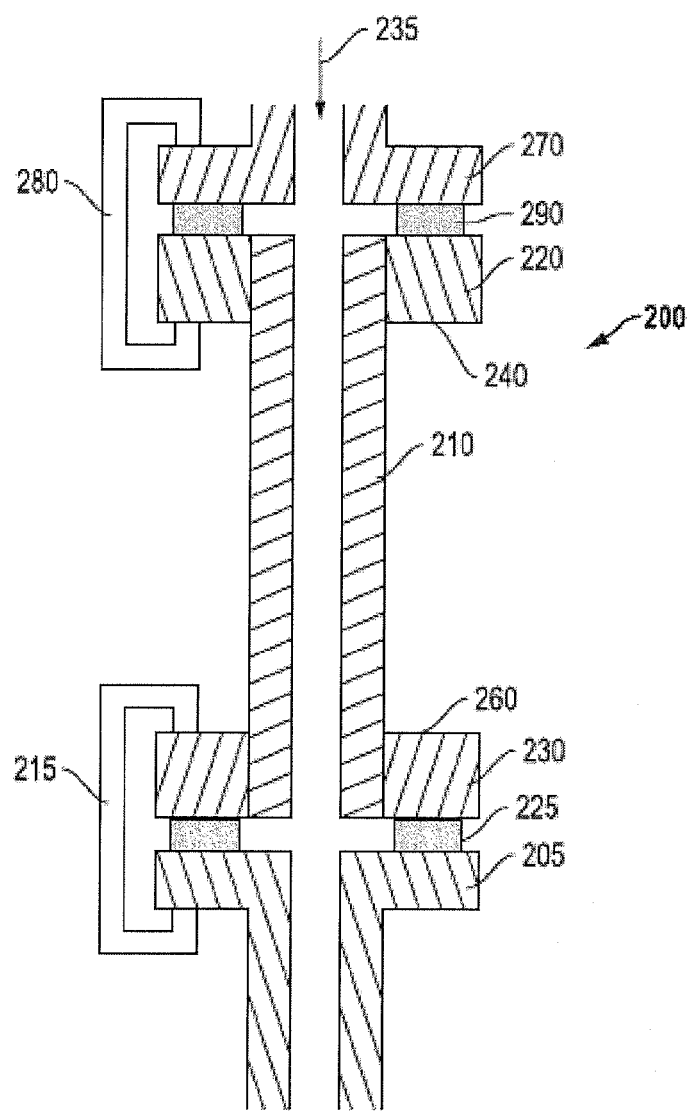
FIG. 2 depicts an embodiment of a ceramic article including a tube with sinter-bonded flanges that is clamped into a heat exchanger.

FIG. 2 shows another embodiment of a ceramic article 200, integrated into one type of heat exchanger. As shown, the ceramic article 200 includes a tube 210, and base components in the form of a first flange 220, and a second flange 230. Although not shown in cross section, the flanges 220 and 230 generally circumscribe, typically fully circumscribe, the tube about the outer diameter of the tube. The height of each flange defines the thickness of the radially projected wall that extends radially outward from the tube. Each first flange 220 includes a planar surface 240 and second flange 230 includes a planar surface 260. A first end about which the first flange 220 is disposed is connected to an upstream conduit structure 270. That upstream conduit structure 270 is held in fluid-tight engagement with the ceramic article 200 via a biasing means, here shown as a clamp 280. Interposed between the conduit structure 270 and the first flange 220 is a gasket 290. As shown by arrow 235 in the drawing, fluid is fed into the tube 210 of the ceramic article 200 through the first end of the ceramic article 200. Similarly, a downstream conduit structure 205 is provided, with a clamp 215 to maintain conduit structure and the ceramic article in fluid tight communication, as well as a second gasket 225. In use, the distance between the flanges 220 and 230 typically represents a hot reaction area, and the stream of fluid upstream of the hot reaction area represents a feed zone, and the fluid stream downstream of the hot reaction area represents a cool down zone.

Figure 3:
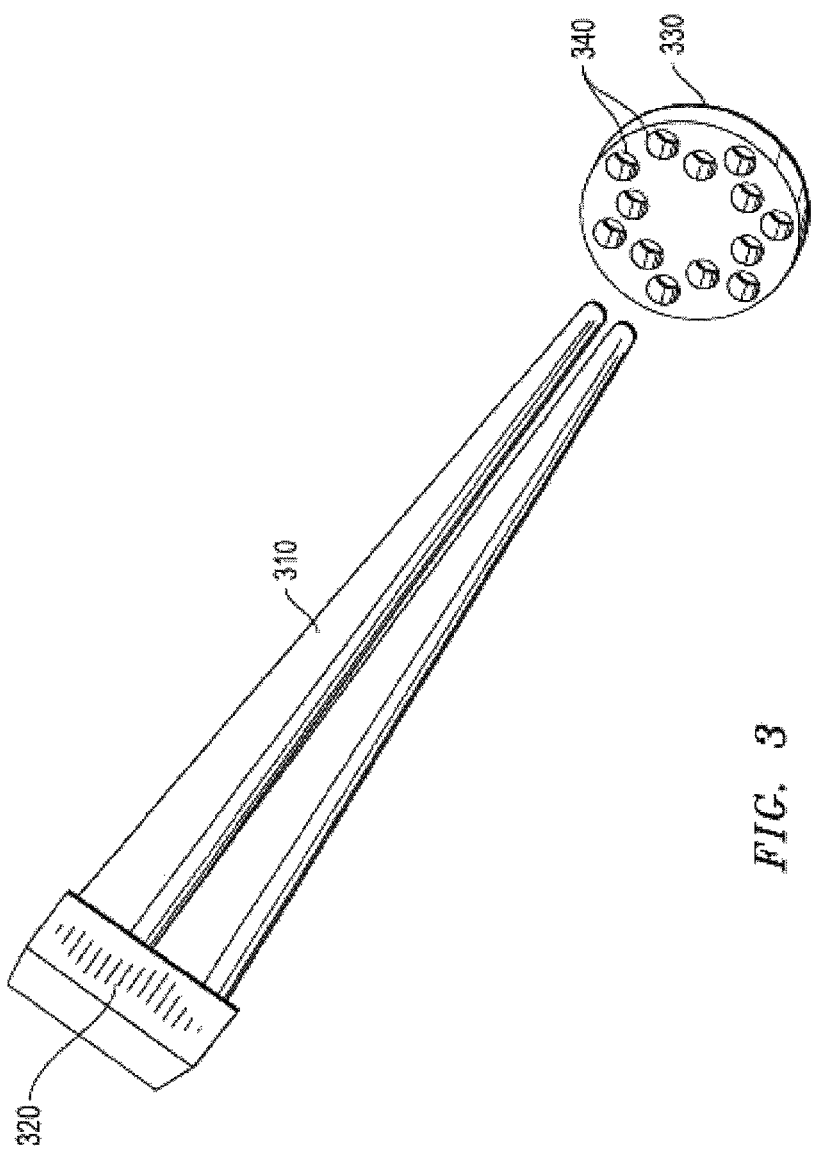
FIG. 3 shows ceramic articles according to an embodiment herein, which can form the building blocks of a heat exchanger, and that includes a tube sheet, a plurality of tubes, and an end cap.
Figure 4:
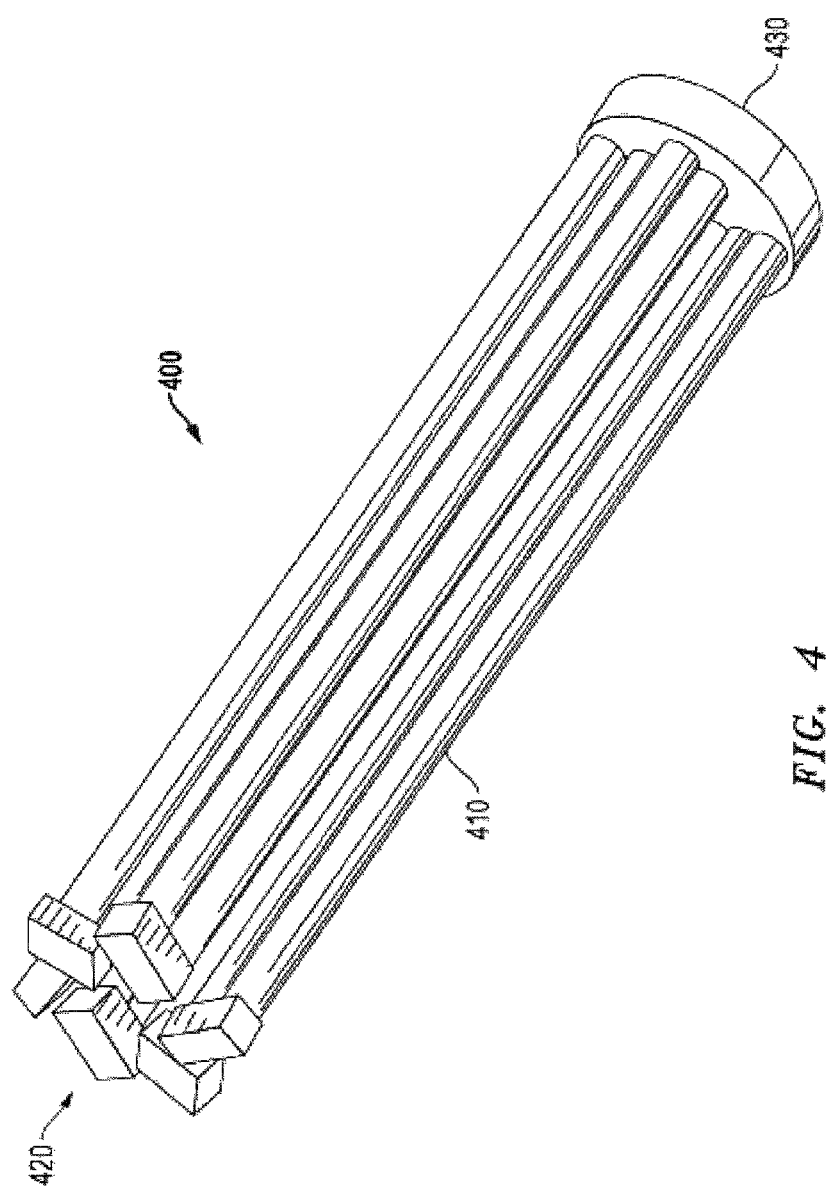
FIG. 4 shows a heat exchanger assembly according to an embodiment herein, which includes the ceramic building blocks shown in FIG. 3.

Turning to FIGS. 3 and 4, a subassembly of another type of heat exchanger is shown. FIG. 3 illustrates first and second tubes 310 interconnected by a cap 320, which maintains fluid communication between the first and second tubes 310. As described above, the cap is sinter-bonded to the tubes. Additionally, a tube sheet 330 is shown, in the form of a disc having multiple holes 340, which receives multiple pairs of tubes and which functions to maintain the spatial relationship between the tubes and provide a hermetic seal at the end of the tubes opposite of the caps. Similarly, the tube sheet 330 is one type of base component, and may be sinter-bonded to the tubes.

FIG. 4 shows a completed heat exchanger subassembly 400. Multiple pairs, in this case six pairs of tubes 410 having caps 420, are integrated with tube sheet 430. The heat exchanger subassembly may be further packaged into a housing (not shown) for industrial use.

Figure 5:
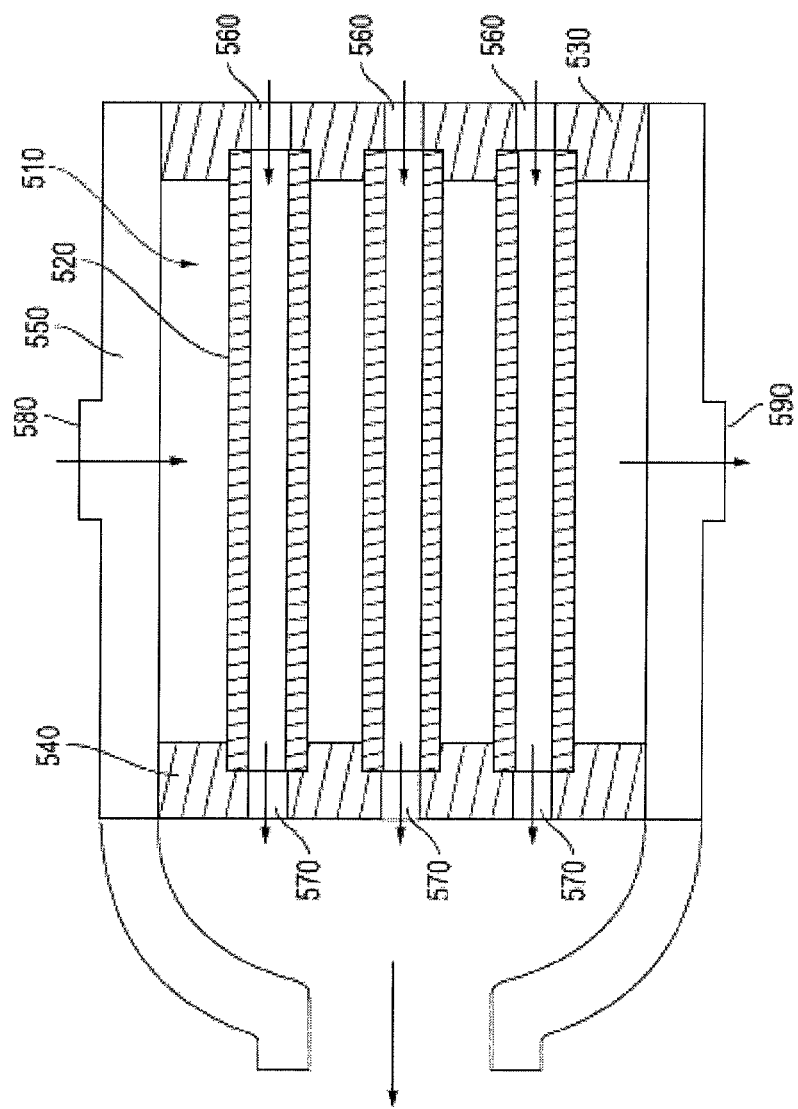
FIG. 5 shows another embodiment of a heat exchanger having ceramic articles including tubes sinter-bonded to tube sheets at distal ends of the tubes, in which the ceramic articles are housed within a housing.

FIG. 5 illustrates yet another heat exchanger arrangement. Here, ceramic articles 510 composed of tubes 520 and tube sheets 530, 540 are packaged within a housing 550. As shown by the arrows entering the tube inlets 560 a fluid such as corrosive gases or liquids may be fed into the interior of the tubes 520, and exit through tube outlets 570. The heat exchanger also includes its own housing inlet 580 and housing outlet 590, which is isolated from the flow of corrosive gases from the tubes. In this way, heat may exchange between the environment within the heat exchanger body and the environment of the flowing gases or liquids through the tubes 520. In this particular embodiment shown in FIG. 5, the tubes do not utilize flanges, but rather opposite tube sheets 530 and 540. However, alternative embodiments may make use of caps, such as those shown in FIGS. 3 and 4 in place of tube sheet 540 for a circuitous flow of gases or fluids, rather than the linear flow shown in FIG. 5.

Figure 6:
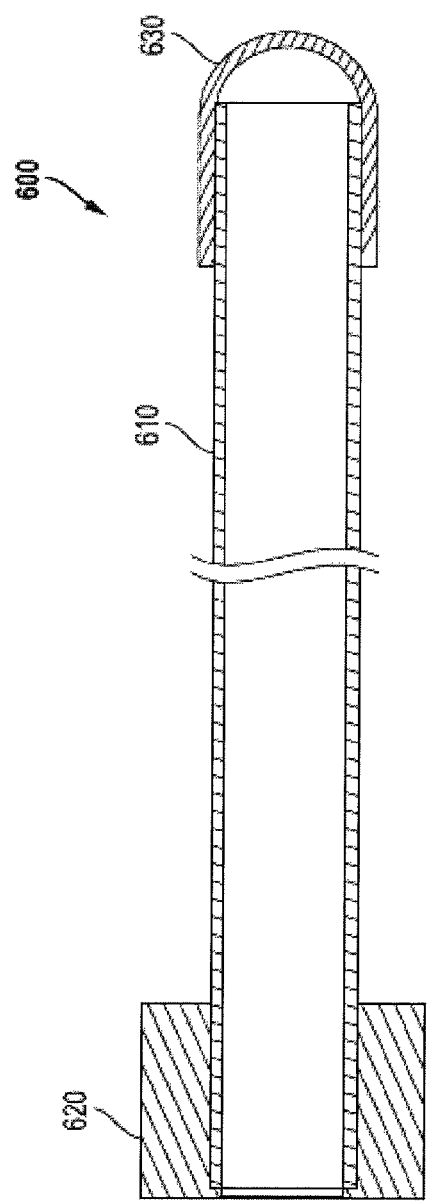
FIG. 6 shows an embodiment of a ceramic article that includes a tube, a flange, and a cap, in which at least one of the flange or cap is sinter-bonded to the tube.

FIG. 6 shows ceramic article 600 that includes a tube 610 having a second component (flange 620) and a third component (cap 630). As described above, each of the flange 620 and cap 630 are sinter-bonded to the tube 610. The tube 610 is pre-sintered prior to the sinter-bonding of the cap and flange to the tube (e.g. co-sintering of the tube, flange, and cap).

Figure 7:
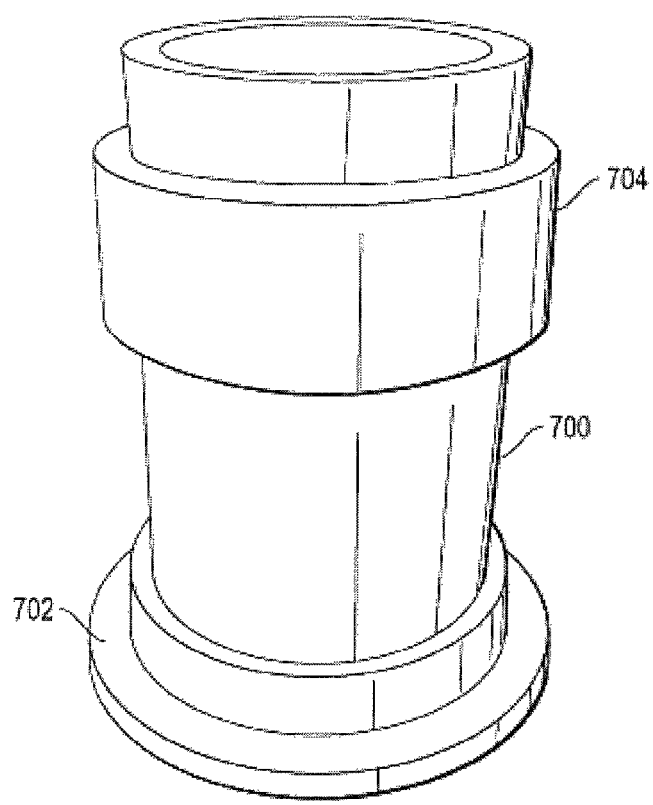
FIG. 7 shows an embodiment of another ceramic article that includes a tube and two flanges, in which one flange is disposed at one end of the tube, and the other flange is disposed along a length of the tube.

FIG. 7 shows yet another embodiment of a ceramic article that includes a tube 700, including opposite flanges 702 and 704. Each of the flanges in this particular embodiment was sinter-bonded to the tube 700, which was pre-sintered.

Figure 8:
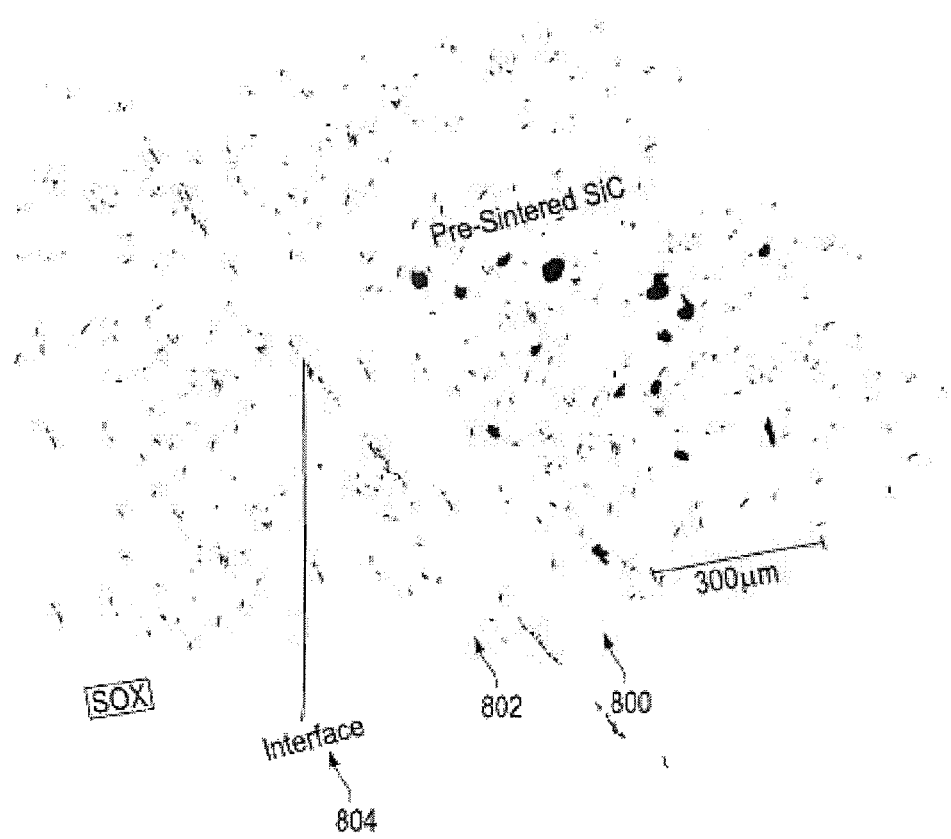
FIG. 8 shows the sinter bond interface between a pre-sintered component, and a sinter-bonded component, each formed of silicon carbide.

FIG. 8 is an SEM cross-section showing the interfacial bond between a pre-sintered silicon carbide tube 800, and a base component 802. Between the components 800 and 802 has provided interface 804, which provides a hermetic seal between components 800 and 802. While the interface may be easily seen in the figure, it should be noted that portions of the interface are obscured by a non-colored or white depiction. These areas indicate areas where grain growth occurred across the interface, functioning to strengthen and enhance the hermetic seal across the interface. Stated alternatively, grains formed of crystals (e.g. crystallographic grains) from each of the two components joined and grew together so as to extend across and bridge the interface creating a strong chemical or crystallographic bond across the interface. Consequently, the bond is more complex than a typical friction-fit direct bond structure, and includes both mechanical and crystallographic components to improve the robustness of the interface.

Example 1

Several ceramic articles were formed to include an interference bond between a ceramic tube and ceramic flange as follows. A 14 mm OD ceramic tube was prepared according to the methods discussed above. One end of the tube was capped, and the tube and cap was pre-sintered according to the methods discussed above in order to provide a pre-sintered tube with a closed end and an open end. Several green ceramic flanges were prepared according to the methods above to fit over the open end of the pre-sintered tube. The green ceramic flanges were engineered to provide a fully-sintered ID that was less than the OD of the 14 mm tube (e.g. interference) by about 0% to about 15%. The green ceramic flanges were provided on the open end of the pre-sintered tube and was co-sintered with the pre-sintered tube to provide an interference bond according to the methods discussed above.

Figure 9:
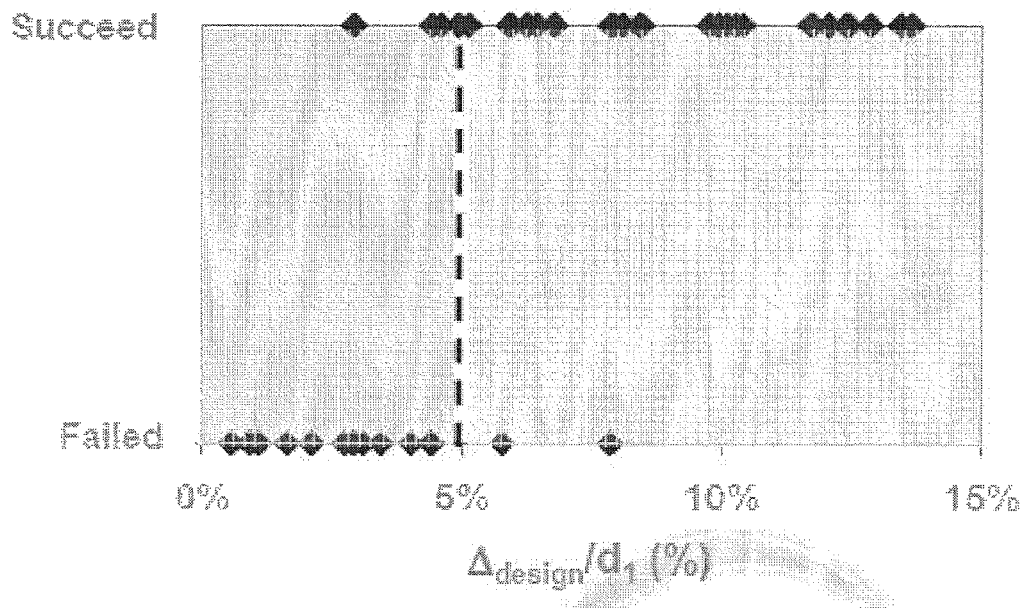
FIG. 9 shows a graph of a pressure test of one embodiment of a ceramic article at 200 psi.

After the ceramic articles were formed, they were pressure tested by providing 200 psi (about 13.8 bar) of helium (He) on one side of the interference bond to determine the integrity of the interference bond of each ceramic article. FIG. 9 shows that the majority of the samples of ceramic articles having a flange engineered to have between about 0% to about 5% fully-sintered ID failed in holding pressure. FIG. 9 also shows that a majority of the sample of ceramic articles having a flange engineered to have between about 5% to about 15% fully-sintered ID succeeded in holding pressure. In particular, FIG. 9 tends to show that a threshold value of about 5% is successful in holding pressure.

Example 2

A ceramic article having a 100 mm OD tube was prepared and pre-sintered according to the methods discussed above, and was fitted with a green flange engineered to have a fully-sintered ID of 3% less than the pre-sintered tube. The tube and flange were co-sintered to form a ceramic article having an interference bond according to the methods discussed above, and pressure tested at 20° C. with 6 barg (bar gauge) of helium on one side of the interference bond to determine the integrity of the interference bond of the ceramic article. The ceramic article lost about 0.2 bar over a 12 hour period.

Example 3

Three ceramic articles having a 35 mm OD tube were prepared and pre-sintered according to the methods discussed above, and each was fitted with a green flange and subsequently co-sintered to form a ceramic article having an interference bond according to the methods discussed above. A first ceramic article included a flange engineered to have a fully-sintered ID of 3% less than the pre-sintered tube, a second ceramic article included a flange engineered to have a fully-sintered ID of 5% less than the pre-sintered tube, and a third ceramic article included a flange engineered to have a fully-sintered ID of 11% less than the pre-sintered tube. The three ceramic articles were subjected to five (5) thermal cycles from 20° C. to 1000° C., and pressurized with 6 barg of helium on one side of the interference bond to determine the integrity of the interference bond of each ceramic article. Pressure readings were taken at 20° C. and 1000° C. for each ceramic article at each iteration of thermal cycling. The results of the 20° C. readings are shown in FIG. 10, and the results for the 1000° C. are shown in FIG. 11, where sample "A" is the 3% sample and depicted as a triangle, sample "B" is the 5% sample and depicted as a diamond, and sample "C" is the 11% sample and depicted as a square.

Figure 10:
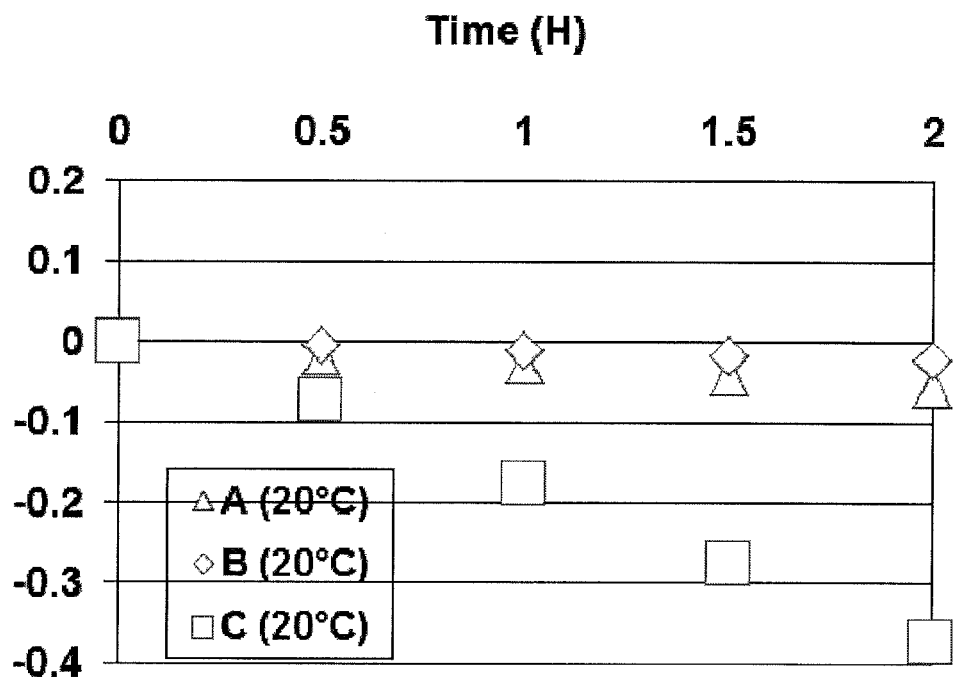
FIG. 10 shows a graph of a pressure test at 20° C. of three embodiments of a ceramic article.

As shown in FIG. 10, samples A and B lost less than 0.1 (−0.1) bar/H at 20° C. The average pressure loss for sample A at 20° C. is less than about 0.03 bar/H, and the average pressure loss for sample B at 20° C. is less than about 0.01 bar/H. FIG. 10 also shows that sample C increasingly lost pressure at each thermal cycle reading taken at 20° C. It is unclear why sample C readings show a continuous loss in pressure as this is contrary to the expectations of that sample.

Figure 11:
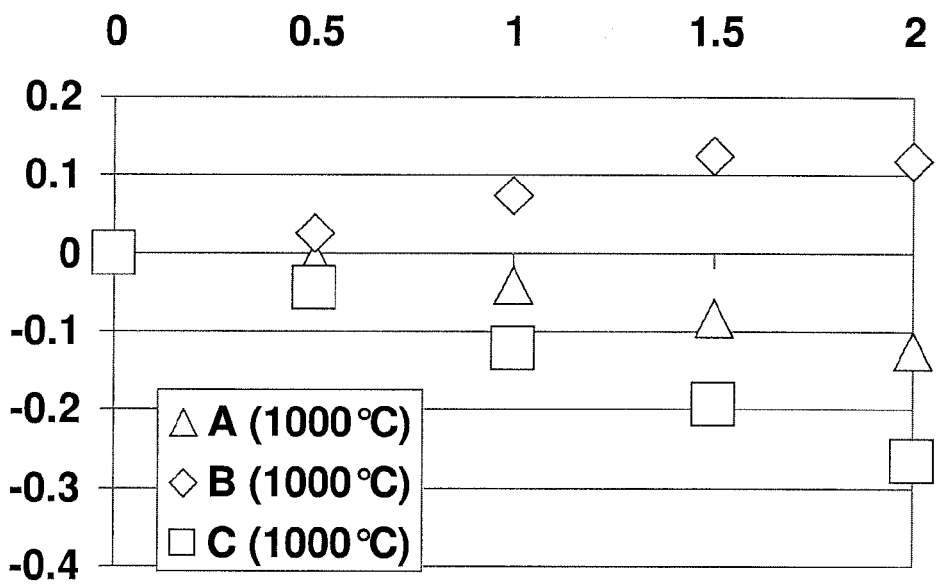
FIG. 11 shows a graph of a pressure test at 1000° C. of the three embodiments of FIG. 10.

Turning to FIG. 11, sample A (the 3% sample) actually shows an increase in pressure at each thermal cycle reading taken at 1000° C. It is unclear why pressure increased in sample A at 1000° C. The average pressure gain of sample A taken at 1000° C. is about 0.06 bar/H. In FIG. 11, sample B (the 5% sample) shows less than 0.2 (−0.2) bar/H pressure loss. The average pressure loss for sample B taken at 1000° C. is less than about 0.03 bar/H. FIG. 11 also shows that sample C (the 11% sample) has a continuous increase in pressure loss at each thermal cycle, which is consistent with the data of FIG. 10. The results of the thermal cycle pressure readings of FIGS. 10 and 11 tend to show that sample B (the 5% sample) provides a tighter interference bond than either sample A or C.

Example 4

Figure 12:
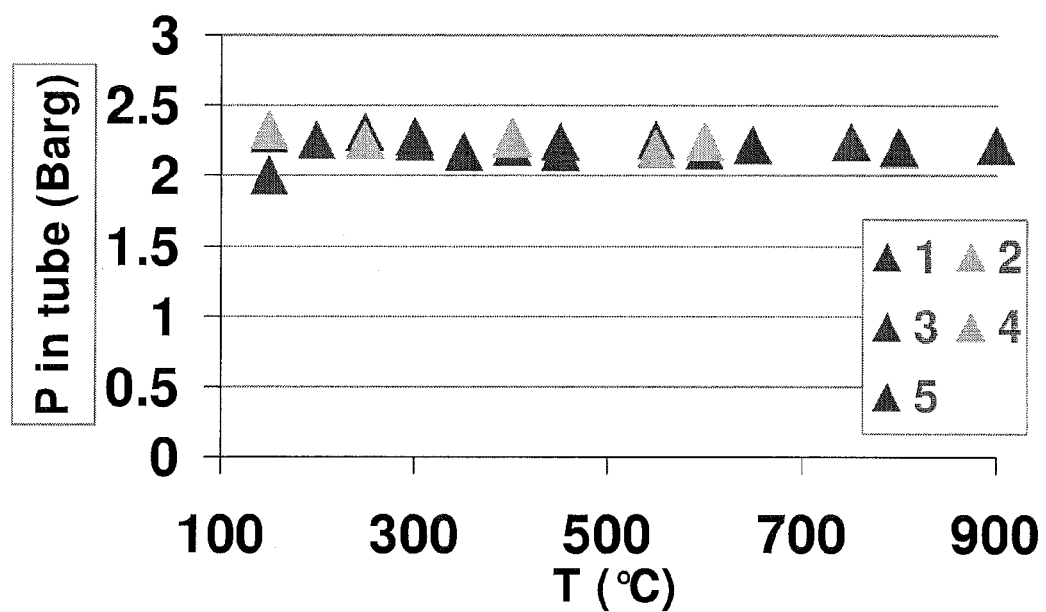
FIG. 12 shows a graph of pressure vs. temperature of a pressure test of an embodiment of a ceramic article through five (5) thermal cycles.

A ceramic article was prepared according to sample B (the 5% sample) in Example 3 above, and was tested for pressure loss at intermediate temperatures by pressurizing one side of the interference bond of the ceramic article with 2 barg of helium while heating the ceramic article up to 1000° C. As FIG. 12 shows, frequent measurements were taken at several temperatures between the thermal cycle of about 100° C. to about 900° C. As FIG. 12 also indicates, the pressure in the tube (measured in barg) remained between about 2 barg and 2.5 barg through the thermal cycle. The results of this example indicate little to no loss or degradation of tightness in the interference bond throughout a thermal cycle, also suggesting that the secondary component (cap, flange, etc.) bonds well to the tube because both components have identical, or nearly identical, coefficients of thermal expansion (CTE). It is also noted that, although not shown in the FIGS., several samples have been known to operate at greater than about 1000° C., greater than about 1300° C., and even greater than 2000° C. with no appreciable increase in pressure loss when subsequently tested at temperatures at or below 1000° C.

Example 5

Figure 13:
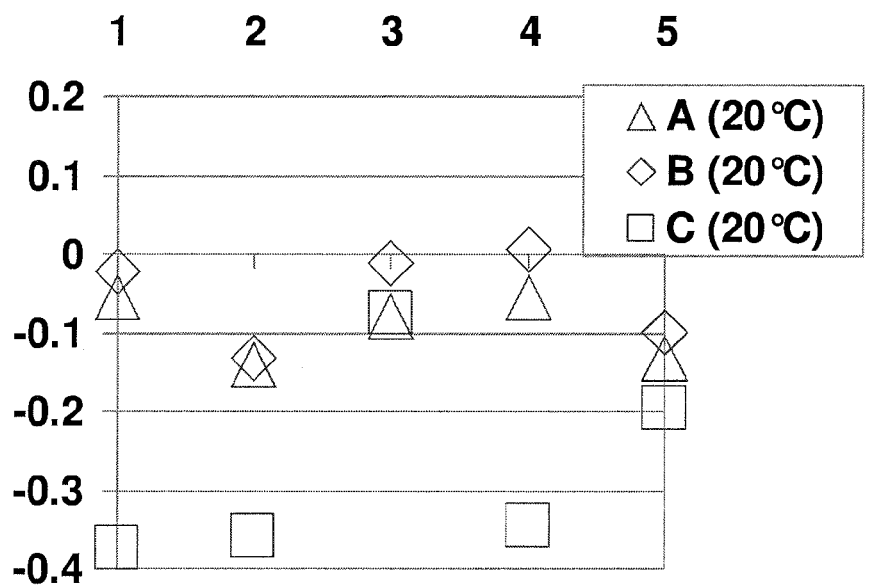
FIG. 13 shows a graph of a pressure test at 20° C. of three embodiments of a ceramic article.
Figure 14:
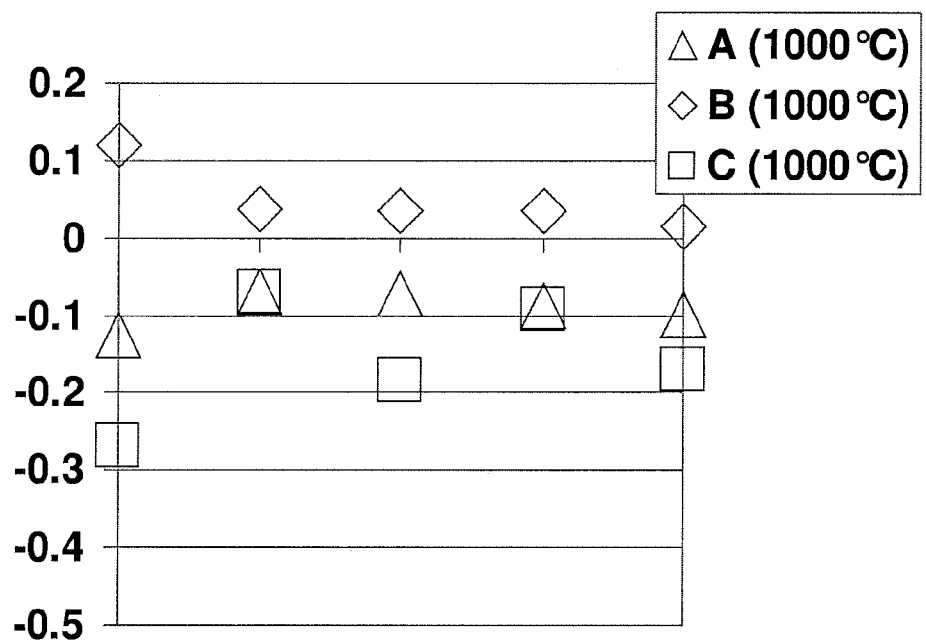
FIG. 14 shows a graph of a pressure test at 1000° C. of the three embodiments of FIG. 13.

Three ceramic articles (samples A, B, and C) were prepared according to example 3 above, and subjected to five (5) testing iterations of thermal cycles between 20° C. and 100° C. while provided with 6 barg of helium on one side of the interference bond of each sample. The results are shown in FIGS. 13 and 14. As shown in FIG. 13, sample A (3% sample) had an average pressure loss at 20° C. of about 0.05 bar/H, sample B (5% sample) had an average pressure loss at 20° C. of about 0.03 bar/h, and sample C (11% sample) had an average pressure loss of about 0.13 bar/H. FIG. 14 shows that sample B tends to provide a pressure increase at 1000° C. It is unclear why sample B increases pressure in the tube at 1000° C. However, FIGS. 13 and 14 appear to indicate that sample B provides the tightest interference bond and, thus, provides higher fidelity in pressure retention at thermal cycling than the other samples.

Example 6

Figure 15:
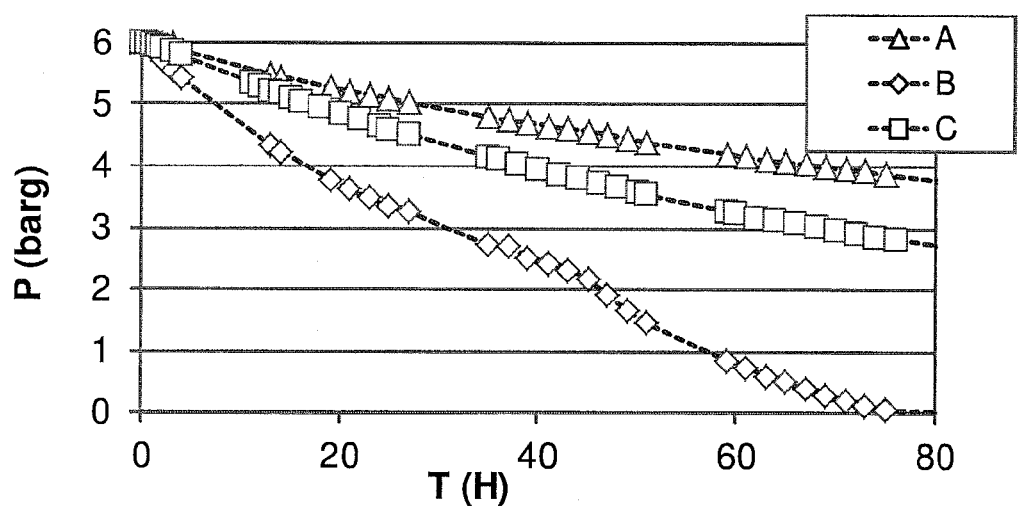
FIG. 15 shows a graph of pressure vs. temperature of a long duration test of three embodiments of a ceramic article.

Three ceramic articles (samples A, B, and C) were prepared according to example 3 above, and subjected to a long duration (about 72-80 hours) pressure test at 1000° C. with 6 barg of helium on one side of the interference bond of each sample. The results of the long duration pressure test are shown in FIG. 15. As shown in FIG. 15, sample B (5% sample) lost all pressure at the end of the long duration test, at approximately 72 hours. The results are anomalous, and it is believed that a hermetic seal was not fully achieved with sample B.

What is claimed is:
1. A sintered ceramic article, comprising:
   a) a first component including silicon carbide;
   b) a second component including silicon carbide, the second component circumscribing at least a portion of the first component; and
   c) an interface between the first component and the second component, the interface being a sinter bond and having at least one performance characteristic selected from the group consisting of:
      i) a Shear Strength not less than about 25 MPa;
      ii) a Nitrogen Seal Performance of not greater than 10%;
      iii) a Helium Seal Performance of not greater than 10%;
      iv) a Vacuum Seal Performance of not greater than 10%.
2. The sintered ceramic article of claim 1, wherein the Shear Strength is not less than about 40 MPa.
3. The sintered ceramic article of claim 1, wherein crystallographic grains from the first component and the second component extend across and bridge the interface.
4. The sintered ceramic article of claim 1, wherein the interface is a hermetic seal.
5. The sintered ceramic article of claim 1, wherein the interface has a Nitrogen Seal Performance, a Helium Seal Performance, or a Vacuum Seal Performance of not greater than about 9%.
6. The sintered ceramic article of claim 1, wherein the interface has a Helium Seal Performance of not greater than 4%.

7. The sintered ceramic article of claim 1, wherein the interface between the first component and the second component is free of bond materials.

8. The sintered ceramic article of claim 1, wherein the first component comprises a tube.

9. The sintered ceramic article of claim 8, wherein the first component has an outer diameter (OD) and a length (L), and an aspect ratio of L:OD of not less than about 10:1.

10. The sintered ceramic article of claim 8, further comprising a third component, the second component and the third components being positioned at opposite axial ends of the tube, wherein the second and the third components are flanges circumscribing the tube about an outer diameter of the tube, each flange having a radially projecting wall terminating at a position to define an outer dimension of the flange.

11. The sintered ceramic article of claim 1, wherein the first component and the second component comprise:
    silicon carbide in an amount of at least about 91 wt % to not greater than about 99.85 wt %, wherein at least about 95 wt % of the silicon carbide is alpha phase.

12. The sintered ceramic of claim 11, wherein the silicon carbide further comprises a carbonized organic material in an amount no greater than about 5.0 wt %;
    boron in an amount from at least about 0.15 wt % to no greater than about 3.0 wt %; and
    additional carbon in an amount no greater than about 1.0 wt %; and
    a predominantly equiaxed microstructure.

13. The sintered ceramic article of claim 1, wherein the second component is a cap, a flange, a cylindrical body, or a tube sheet.

14. The sintered ceramic article of claim 13, wherein the second component is a flange and the first component is a tube, the flange circumscribing the tube about an outer diameter of the tube, the flange having a radially projecting wall terminating at a position to define an outer dimension of the flange.

15. The sintered ceramic article of claim 14, wherein the flange has a circular outer contour, the outer dimension is an outer diameter, and the outer diameter not less than about 1.2×(outer diameter of the tube), such as not less than 1.3× (outer diameter of the tube).

16. The sintered ceramic article of claim 14, wherein the radially projecting wall has at least one planar surface.

17. The sintered ceramic article of claim 16, wherein the at least one planar surface extends along a plane that is perpendicular to the longitudinal axis of the tube.

18. A sintered ceramic article, comprising:
    a plurality of ceramic tubes;
    a tube sheet having holes,
    wherein each tube of the plurality of ceramic tubes is sinter bonded to the tube sheet along an interface at an inside surface of a respective hole of the tube sheet, the interface between each ceramic tube of the plurality of ceramic tubes being free of bond materials, and
    wherein each interface has at least one performance characteristic selected from the group consisting of:
        i) a Shear Strength not less than about 25 MPa;
        ii) a Nitrogen Seal Performance of not greater than 10%;
        iii) a Helium Seal Performance of not greater than 10%;
        iv) a Vacuum Seal Performance of not greater than 10%.

19. The sintered ceramic article of claim 18, further comprising a housing encasing the plurality of ceramic tubes and the tube sheet, the housing including a fluid inlet and a fluid outlet.

20. A method of forming a sintered ceramic article, comprising:
    forming a green first component;
    pre-sintering the green first component to form a sintered first component;
    surface cleaning at least a portion of an outer surface of the sintered first component to remove surface contaminants therefrom;
    arranging a second component to circumscribe the sintered first component along the portion subjected to surface cleaning, the second component being in an un-sintered state or a partially sintered state; and
    sintering the first component together with the second component to form a sinter bond between the first component and the second component.

* * * * *